Nov. 15, 1966  D. C. FLACK  3,284,903
INSTRUMENTS FOR MEASURING RECORDED TRACES
Filed Feb. 13, 1964  4 Sheets-Sheet 1
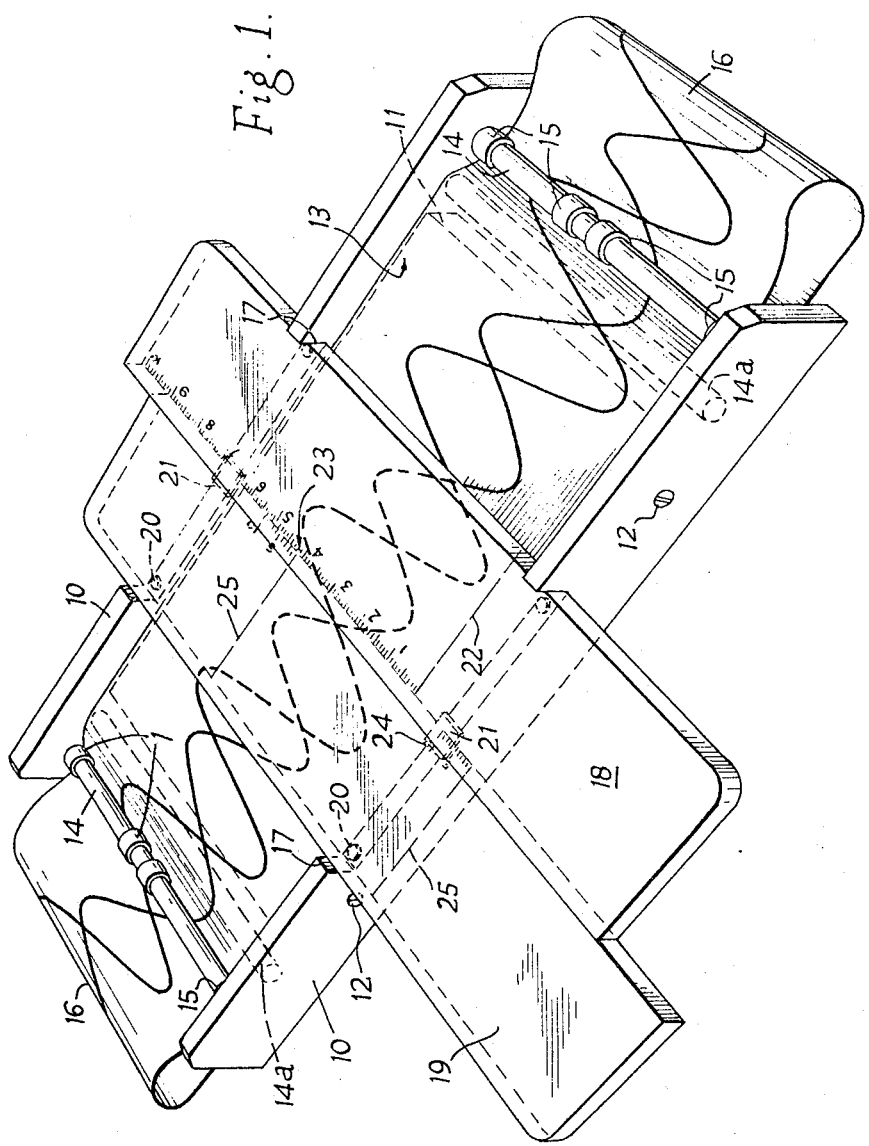
INVENTOR
DENNIS CLIFFORD FLACK
BY
Irwin S. Thompson
ATTORNEY

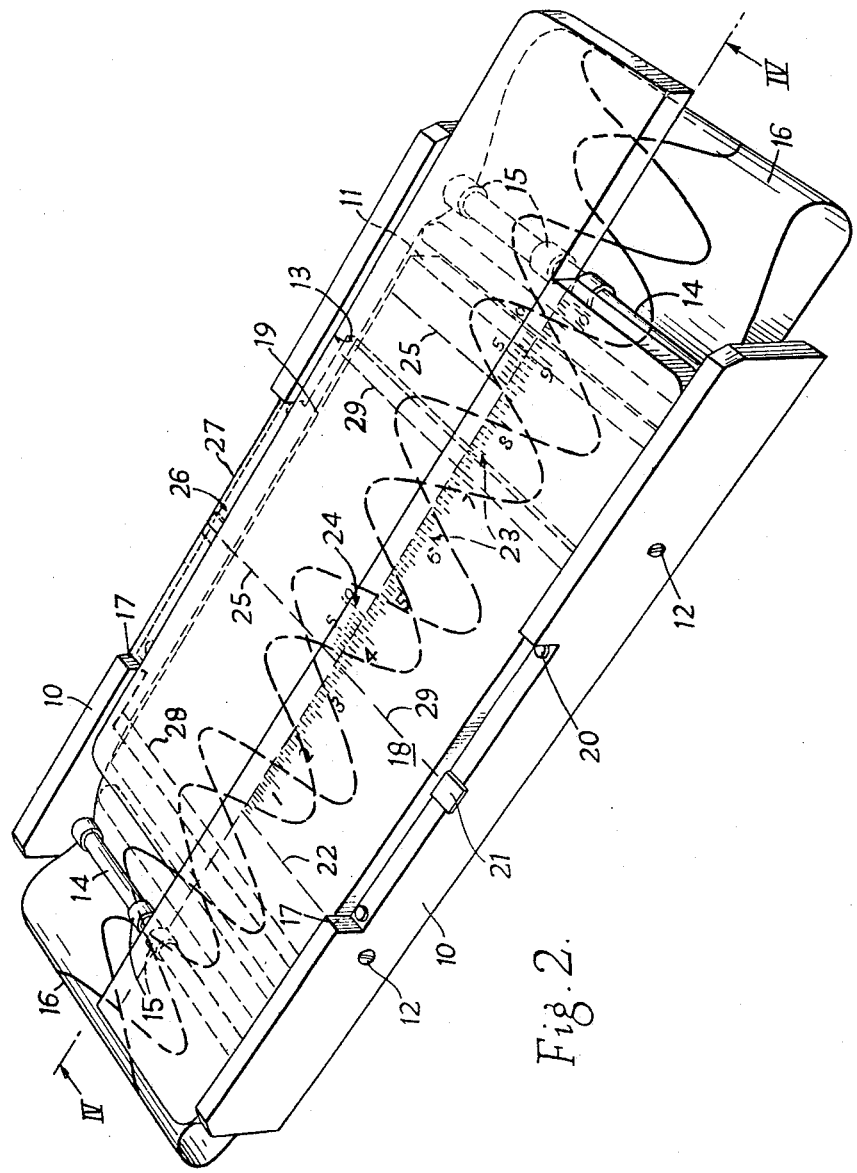

Nov. 15, 1966  D. C. FLACK  3,284,903
INSTRUMENTS FOR MEASURING RECORDED TRACES
Filed Feb. 13, 1964  4 Sheets-Sheet 3
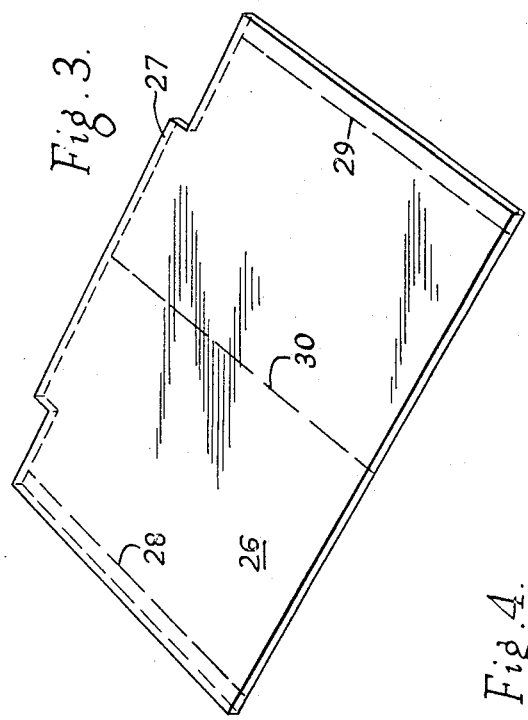
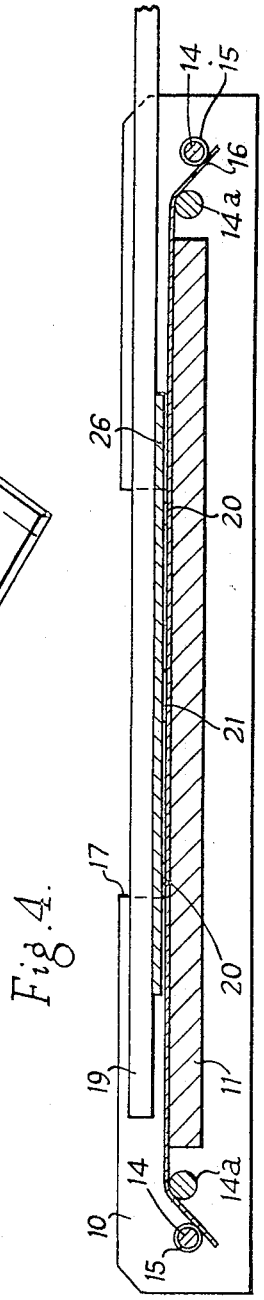
INVENTOR
DENNIS CLIFFORD FLACK
BY
Irwin S. Thompson
ATTORNEY

INVENTOR
DENNIS CLIFFORD FLACK
ATTORNEY

United States Patent Office 3,284,903
Patented Nov. 15, 1966

3,284,903
INSTRUMENTS FOR MEASURING
RECORDED TRACES
Dennis C. Flack, Aldwick, Bognor Regis, England, assignor to Sangamo Weston Limited, Enfield, England, a British company
Filed Feb. 13, 1964, Ser. No. 344,780
Claims priority, application Great Britain, Nov. 22, 1963, 46,252/63
21 Claims. (Cl. 33—1)

This invention relates to instruments for measuring recorded traces which are in strip form such as those produced by pen recorders, and is particularly concerned with a chart reader which enables measurements to be made along both axes of such a recorded trace in a simple and accurate manner.

The widespread use of automatic recorders in association with a wide variety of mechanical and electrical apparatus such as ultra-violet recorders, cathode ray oscilloscopes and the like, has led to the necessity of providing a simple instrument for facilitating the making of measurements on these recorded traces. The present invention provides such an instrument which can be used for making measurements along either axis of the recorded trace. For example, the amplitude of a wave may be found from measurements taken along one axis of the trace and the phase angle and wave-length of the wave be found from measurements taken along the axis at right-angles to the first axis.

One object of the present invention is therefore to provide an instrument which enables measurements to be made along two axes of a record strip which are mutually disposed at right-angles, by using a measuring scale plate arrangement which can be adapted to lie parallel to either of said two axes.

Another object of the invention is to provide an instrument which includes two transparent scale plates having cursor lines marked thereon and arranged to act as a vernier gauge in order to effect accurate measurement on the recorded traces.

The invention, therefore, has for a further object the provision of an instrument which has a framework comprising two parallel side members and a platform member forming a tray through which a record strip can be passed, and means for supporting the scale plates in each of the two positions parallel to the axes of the record strip. The means for supporting the scale plates preferably comprises slots formed in the upper surfaces of the side members for one direction and the slot formed by the two side members in the other direction.

Another object of the invention is to provide an instrument having a single measuring scale plate and a dial clock gauge secured thereto for indicating the extent of movement of the scale plate, the clock gauge being provided with a sensing plunger passing therethrough and having the plunger arranged to abut against an adjustable stop secured to a rigid part of the instrument.

Other objects and advantages of this invention will be particularly set forth in the claims and will be apparent from the following description, when taken in conjunction with the accompanying drawings, in which the same or equivalent members are denoted by like reference numerals, and in which:

FIGURE 1 is a perspective view of a first embodiment of a chart reader according to the invention, arranged for taking measurements in a first direction;

FIGURE 2 is a perspective view of the embodiment according to FIG. 1, arranged for taking measurements in a direction at right angles to the first direction;

FIGURE 3 shows a cursor plate for use with the arrangement illustrated in FIG. 2;

FIGURE 4 is a sectional view taken along the line IV—IV of FIG. 2, with the cursor plate of FIG. 3 in position;

Figure 5:
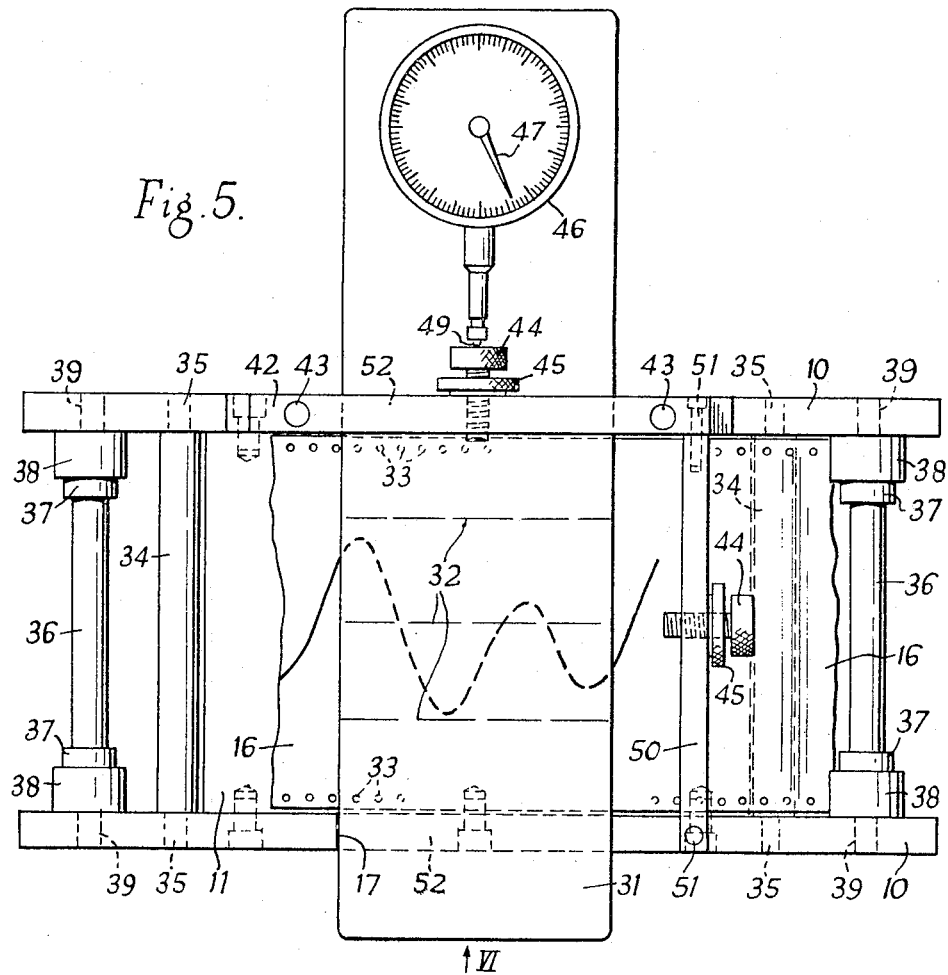
FIGURE 5 is a plan view with parts broken away of a second embodiment according to the invention.

Referring first to FIG. 1 of the drawings, the instrument comprises a framework constituted by two substantially rectangular side members 10 which are maintained in spaced parallel relationship by a rectangular platform member which is indicated in broken outline at 11 and which is secured to the side members 10 in a horizontal plane at a position approximately half-way up the side members 10 by means of screws 12 or the like, thus forming a tray 13. Two cylindrical rods 14 are disposed one adjacent each end of the side members 10, said rods extending between the side members 10 and at right angles thereto. Each rod 14 carries two identical pairs of annular rollers 15 around the periphery thereof, one roller of each pair abutting against a side member 10 and the other roller of each pair being located in the central region of the rods 14. Two further cylindrical rods 14a (FIG. 4) are disposed adjacent the edge of the platform member 11, these rods being smooth and having no annular rollers thereon. Alternatively, all four rods 14, 14a may be of uniform diameter, i.e., without annular rollers. The height of the top of the rollers 15 above the base of the instrument is arranged to be slightly less than the height of the upper surface of the platform member 11 above the same base plane.

The continuous record strip 16 which carries the recorded traces thereon is arranged to pass under the rollers 15 at one end of the instrument, over a rod 14a, through the tray 13, over the other rod 14a and under the rollers 15 at the other end of the instrument, thus ensuring that the record strip 16 remains flat on the platform member 11 at all times during operation of the instrument.

In order to effect measurements on the traces carried by the record strip 16 the following arrangement is provided. Each of the side members 10 has a rectangular slot 17 extending downwards from its upper surface and across the whole transverse dimension thereof, these two slots 17 being aligned with each other and being of equal depth. The slots 17 also have a dimension in the direction of movement of the record strip 16 which is equal to the width of the tray 13.

A pair of substantially rectangular, transparent measuring scale plates comprising a first transparent scale plate 18 and a second transparent scale plate 19 are arranged to lie side-by-side across the instrument and to be slidably received either in the slots 17 or between the side members 10, the two scale plates 18, 19 having a combined width such that they are able to slide smoothly relative to one another but without any appreciable play, both when in the slots 17 and when arranged to lie between the side members 10 on the rollers 15 (FIGS. 2 and 4. The two scale plates 18, 19 are preferably formed from a suitable synthetic plastics material, although glass plates may be used if required. Extending vertically upwards through the side members 10 so as to project a short distance above the base of each slot 17 are cylindrical support pegs 20 which are disposed one adjacent each end of each slot 17. In addition, a supporting plate 21 is mounted centrally in the base of each slot 17 in a position beneath the common interface of the two scale plates 18, 19. The support pegs 20 and supporting plates 21 are made of a non-abrasive semi-resilient material over which the scale plates 18, 19 are able to slide smoothly without the undersurfaces of the scale plates becoming scratched. The surfaces of the plates 21 are preferably white.

The first scale plate 18 is marked with regular scale divisions 23 along a substantial part of its length at the edge forming the common interface with the other scale plate 19, and is also provided with a cursor line 22 which extends across the whole width of the scale plate 18 at right-angles to the longitudinal axis of the scale plate from the point representing the zero end of the scale divisions 23. All these scale markings are formed in the lower flat surface of the plate 18 to avoid parallax errors when using the instrument. The second scale plate 19 is marked with a set of corresponding vernier scale divisions at one or more positions along its length, such as indicated at 24 on FIG. 1, these vernier markings also being adjacent the common interface of the two scale plates 18, 19. Each set of vernier scale divisions has an associated cursor line 25 extending across the whole width of the scale plate 19 at right-angles to the longitudinal axis of the scale plate from each zero vernier mark. These scale markings on the second scale plate 19 are likewise formed in the undersurface of the scale plate. The scale divisions may of course be calibrated in either English or metric quantities, whichever is more convenient for making the measurements required, or alternatively, a single pair of scale plates may be calibrated in both systems by marking the two systems one along each longitudinal face of the scale plates and by arranging that the positions of the two scale plates can be interchanged.

The method of operation of the instrument for making vertical or amplitude measurements of traces on the record strip 16, i.e., measurements of quantities occurring as abscissae on the record strip, is effected as follows. The record strip 16 which carries the recorded trace or traces to be analysed is arranged to pass between the side members 10, through the tray 13, over the rods 14a and under the rollers 15 at each end of the instrument. The measuring scale plates 18, 19 are then placed in the slots 17 and are adjusted relative to each other so that the trace which is to be measured lies between the cursor line 22 of the first scale plate 18 and one of the cursor lines 25 on the vernier scale plate 19. By taking readings using the vernier scale an accurate reading of the measurement required can thus be obtained, and such measurement can be repeated at each required position simply by moving the record strip 16 through the tray 13.

Reference is now made to FIGS. 2, 3 and 4 of the drawings which show the second arrangement of the scale plates 18, 19 in the instrument. This arrangement enables measurements to be made in the direction of travel of the record strip 16. It is basically similar to the arrangement illustrated in FIG. 1 except that the two measuring scale plates 18, 19 are arranged to lie along the longitudinal axis of the instrument between the two side members 10 and on the record strip 16 passing over the platform member 11. In addition to the two scale plates 18, 19 a transparent cursor plate 26 (FIG. 3) is provided for insertion between the record strip 16 and the scale plates 18, 19 during this manner of use. This cursor plate 26 consists of a thin plate of material, such as that used to form the two scale plates; it is generally rectangular in shape and has a width at each end equal to the perpendicular distance between the side members 10 and is provided with a projecting portion 27 along one longitudinal edge of length equal to the length dimension of the slots 17. This cursor plate 26 is arranged to lie snugly between the side members 10 and to be prevented from longitudinal movement by having its projecting portion 27 seated in one of the slots 17. Three cursor lines 28, 29, 30 are marked on the undersurface of the cursor plate 26 and extend across the whole width thereof, one centrally and one adjacent each end of the cursor plate, the purpose of these cursor lines 28, 29, 30 being to facilitate the measurement of traces which do not cross the line of contact between the two measuring scale plates 18, 19.

In order to make horizontal measurements of the traces, i.e., measurements of quantities occurring as ordinates on the record strip 16, the cursor plate 26 is placed on the record strip 16 with its projecting portion 27 securely seated in one of the slots 17, the scale plates 18, 19 are placed between the side members 10 and on the rollers 15, and then by suitably adjusting the relative positions of the two scale plates 18, 19 measurements can be made. Recorded traces which cross the line of contact between the scale plates 18, 19 can be measured without the aid of the cursor plate 26 since the line of contact forms an arbitrary zero line. However, for traces lying either wholly above or wholly below the line of contact, the cursor plate 26 must be used. Traces lying mainly above the line of contact i.e., beneath the scale plate 19, are measured from the left, as seen in FIG. 2, using the cursor line on the cursor plate 26 which appears at the left-hand end of the instrument, and traces lying mainly below the line of contact, i.e., beneath the scale plate 18, are measured from the right using the cursor line on the cursor plate 26 which appears at the right-hand end of the instrument.

Figure 6:
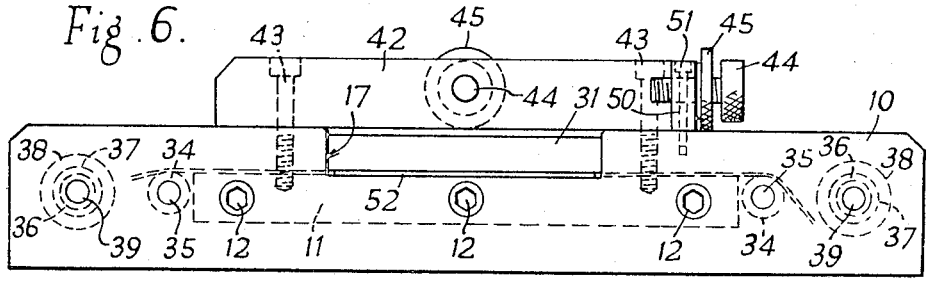
FIGURE 6 is a side elevational view taken along the line VI—VI of FIG. 5.

In the embodiment hereinbefore described, two relatively movable scale plates have been used. In one alternative construction, as illustrated in FIGS. 5 and 6, a single scale plate is used in conjunction with a dial clock gauge for indicating its extent of movement from one position to another. Referring now to FIGS. 5 and 6, the instrument again comprises two side members 10 maintained in spaced parallel relationship by a platform member 11. In this embodiment, however, a single transparent scale plate 31 is arranged to rest in the slots 17 formed in the upper faces of the side members 10. The substantially rectangular scale plate 31 has a set of cursor lines 32 marked on its undersurface, these cursor lines extending transversely across the whole width of the scale plate 31 and parallel to the direction of travel of a record strip 16. The function of these cursor lines 32 will be described later. In this embodiment the scale plate 31 rests on strips 52 of a non-abrasive material such as white self-adhesive plastic sheet. Such strips 52 are caused to adhere to the bottom of the slots 17 and can be used instead of the support pegs 20 and supporting plate 21 in the first embodiment of the invention.

The record strip 16 is shown provided with two sets of regular perforations 33 running parallel to its direction of movement for use in driving the strip when in the recording instrument, the strip being of a width very slightly less than the perpendicular distance between the side members 10. A cylindrical roller 34 is provided adjacent each end of the platform member 11, each roller being journalled at each end in the side members 10 by reduced diameter ends 35 so that the rollers extend across the instrument parallel to the edge of the platform member 11 and at a height such that the highest point on the periphery of each roller is level with the upper surface of the platform member 11. At each end of the instrument between the cylindrical rollers 34 and the ends of the side members 10 is provided a scale plate supporting assembly. Each assembly comprises a roller having a central cylindrical portion 36 and having at each end thereof an increased diameter step portion 37 and a collar 38 of a diameter larger than said step portion 37. The collars 38 abut against the inner surfaces of the side members 10 and the roller assembly is fitted to the side members 10 by spigots 39 or the like. The perpendicular distance between the inwardly facing surfaces of the collars 38 is arranged to be such that the scale plate 31 can slide smoothly between the collars 38 without transverse movement.

In order to provide for the calibration of the instrument the following arrangement is used. A longitudinally arranged side bar 42 which is substantially rectangular in longitudinal cross-section is secured on the upper surface of one of the side members 10 by means of screws 43 or the like. Alternatively, the side bar 42 may take the form of a side plate attached to the outer side surface of one of the side members 10 to project a distance above it, and secured thereto by horizontally disposed screws or bolts. A screw 44 having an enlarged cylindrical head with a knurled peripheral surface is screwed into the side bar 42 inwardly from its outer surface, and this screw 44 is provided with an annular locking collar 45 around its shank, the collar being of larger diameter than the screw head and also having a knurled peripheral surface. This screw arrangement acts as an adjustment device for a dial clock gauge 46 which is secured to the scale plate 31 adjacent the end thereof which extends outside the side bar 42. The function of the dial clock gauge 46 will be described in more detail later. The clock gauge 46 has a pointer 47 which is caused to rotate by the reciprocable movement of a sensing plunger 48 which passes through the clock gauge 46 and terminates adjacent the head of the adjustment screw 44 in a conical tip 49.

In order to enable measurements to be effected when the scale plate 31 and associated dial clock gauge 46 are arranged longitudinally of the instrument on the rollers 39, a transverse cross-bar 50 is placed across the instrument to abut against the side bar 42 at its one end and to rest on the opposed side member 10 at its other end. The cross-bar 50 is secured to the side bar 42 and the side member 10 by means of screws 51 or the like and is also provided with a screw and collar assembly 44, 45 corresponding to the adjustment device fitted to the side bar 42. In this manner, the sensing plunger 48 of the dial clock gauge 46 is able to abut against the screw 44 when the scale plate 31 is lying parallel to the direction of motion of the record strip 16.

The method of operation of the instrument incorporating the clock gauge is as follows. When the scale plate 31 is in the position as shown in FIGS. 5 and 6, the instrument is used for making measurements occurring as abscissae on the record strip 16. The cursor lines 32 are equi-spaced and the number of cursor lines required is determined by the width of the record strip 16 and the construction of the clock gauge 46. The instrument shown in FIGS. 5 and 6 has three cursor lines 32 spaced so as to cover the full width of the record strip 16 and the clock gauge 46 is such that one complete revolution of the pointer 47 corresponds to a linear movement of the scale plate 31 which is equal to the perpendicular distance between two adjacent cursor lines 32. Therefore by moving the scale plate 31 within the slots 17 so that certain of the cursor lines 32 are positioned over a trace recorded on the record strip 16 and then setting the adjustment screw 44 so that it contacts the tip 49 of the sensing plunger 48 a first gauge reading is obtained. By moving the scale plate 31 to further positions and making the necessary screw adjustments each time readings can be obtained for each recorded quantity which it is desired to measure. An identical procedure is carried out for effecting measurements of quantities occurring as ordinates on the record strip 16 when the scale plate 31 and associated clock gauge 46 rest on the rollers 36 at each end of the instrument. In this position the adjustment screw 44 on the cross-bar 50 is used for the setting of the sensing plunger 48.

In alternative arrangements using a clock gauge for effecting measurements, the number of cursor lines may be decreased or increased from the number shown depending on the construction of the instrument. If the clock gauge is itself required to accommodate a linear movement equal to the full width of the record strip 16, then either a multi-turn clock or a clock having a diameter large enough to take such a movement can be used. In such a case, only a single cursor line 32 may be required for making the necessary measurements.

Various other constructional modifications may be made to the instrument without exceeding the scope of the invention. The chart reader may be manufactured with different dimensions to suit various particular widths of record strips, or, alternatively, a single instrument may be adapted to take varying widths of strips up to the distance between the side members 10 by inserting suitable guiding devices in the tray 13 or on one of the side members 10 to keep the record strip 16 pressed against one or other of the side members 10. In addition, instead of arranging to have a single scale plate resting on the record strip in the position parallel to the direction of movement of the record strip, grooves formed in the inwardly facing surfaces of the side members 10 may be used to support the scale plate. These grooves run parallel to the base of the instrument and are arranged such that the scale plate is able to be moved smoothly just above the surface of the record strip.

I claim:

1. An instrument for measuring traces recorded in strip form which comprises two parallel side members defining a record strip receiving channel, the transverse extent of said channel being equal to the width of a record strip arranged to pass therethrough, means for guiding said record strip through said channel, and measuring scale means constituted by two contacting transparent scale plates arranged side-by-side, said scale plates being supported by scale plate support means when said scale plates are in a first position movable in a direction parallel to the longitudinal axis of said record strip and being movable in a slot formed in the upper surface of each of said side members when said scale plates are in a second position movable in a direction perpendicular to the longitudinal axis of said record strip.

2. An instrument for measuring traces recorded in strip form as claimed in claim 1, in which one of said scale plates is provided with scale division markings along a substantial part of its length adjacent the common interface of the two scale plates, the other plate being provided with at least one set of corresponding vernier scale division markings adjacent said common interface, and cursor lines being provided to extend across the width of the scale plates from each zero scale mark of the regular and vernier scale division markings.

3. An instrument for measuring traces recorded in strip form as claimed in claim 1, in which said scale plate support means comprises a platform member secured between said side members and over which said record strip is arranged to be passed.

4. An instrument for measuring traces recorded in strip form as claimed in claim 2, in which said scale division markings and said vernier scale division markings are provided in the lower surface of said scale plates.

5. An instrument for measuring traces recorded in strip form as claimed in claim 2, in which, when said scale plates are in said first position, a cursor plate is disposed between said record strip and said scale plates, said cursor plate being arranged to lie between said side members and to have a projecting portion arranged to engage in one of said slots, thus locking said cursor plate against movement, and to have a plurality of cursor lines marked thereon extending in a direction perpendicular to the direction of movement of said record strip.

6. An instrument for measuring traces recorded on a strip form carrier which comprises a framework including a support platform to underlie a length of said carrier and strip edge guide means located at each end of said platform with a spacing equal to the width of said strip form carrier to define a record strip receiving channel through which said strip form carrier is freely movable lengthwise without lateral displacement, rectilinear transparent scale plate means having opposed longitudinal side edges which are parallel, said scale plate means being provided with at least one cursor line at right angles to said longitudinal side edges, first scale plate guide means on said framework for slidably receiving said scale plate means for free longitudinal adjustment movement of said scale plate means over and relative to said platform in a direction parallel with the length of said strip form carrier and second scale plate guide means on said framework for slidably receiving said scale plate means for free longitudinal adjustment movement of said scale plate means over and relative to said platform in a direction at right angles to the length of said strip form carrier.

7. An instrument as claimed in claim 6 in which said rectilinear scale plate means comprises two strip-form members each having opposed parallel longitudinal side edges.

8. An instrument as claimed in claim 6 in which said rectilinear scale plate means comprises two strip-form members each having opposed parallel longitudinal side edges and arranged to lie side by side with one side edge of each in sliding contact with the other along a common interface.

9. An instrument as claimed in claim 6 which comprises two parallel side members secured to opposite sides of a rectangular support platform, said side members extending above the level of said platform to define the record strip receiving channel therebetween.

10. An instrument as claimed in claim 6 in which said rectilinear scale plate means comprises a single elongated rectangular plate-form member.

11. An instrument as claimed in claim 6 which comprise a removable cursor plate of transparent material and provided with at least one cursor line thereon, said cursor plate being shaped to lie in said record strip receiving channel beneath said scale plate means and to be held in fixed position by co-operation with said second scale plate guide means.

12. An instrument as claimed in claim 7 in which at least one of said strip-form scale plate members is provided with measuring scale markings extending in the longitudinal direction thereof.

13. An instrument as claimed in claim 8 in which each of said strip-form scale plate members is provided with measuring scale markings extending in the longitudinal direction thereof.

14. An instrument as claimed in claim 13 in which said scale markings are located adjacent the respective side edges forming said common interface and in which the scale markings on one member are arranged to provide a vernier measuring system for the scale markings on the other member.

15. An instrument as claimed in claim 9 in which said side members are provided with transversely aligned recesses in their respective upper edges to form said second scale plate guide means.

16. An instrument as claimed in claim 9 in which said side members extend at each end beyond the adjacent ends of said platform and which includes record strip guide rollers rotatably mounted between said extended ends of said side members to lie transverse to the length of said record strip.

17. An instrument as claimed in claim 16 in which at least one of said rollers at each end of said platform is of reduced diameter over its mid region, said reduced diameter region being of a length equal to the record strip width to form said strip edge guide means.

18. An instrument as claimed in claim 10 in which said single scale plate member carries displacement indicating means co-operating with a datum defining surface on said framework.

19. An instrument as claimed in claim 18 in which said displacement indicating means is a clock gauge having a sensing plunger.

20. An instrument as claimed in claim 19 in which said platform is provided with a first datum defining abutment surface positioned to engage said sensing plunger when said scale plate member is positioned in said first scale plate guide means and with a second datum defining abutment surface positioned to engage said sensing plunger when said scale plate member is positioned in said second scale plate guide means.

21. An instrument as claimed in claim 20 in which each of said first and second datum defining abutment surfaces are adjustable in position relative to said framework in directions parallel with the displacement direction of said sensing plunger.

References Cited by the Examiner

UNITED STATES PATENTS

| 1,142,077 | 6/1915 | Buchanan | 33—80 |
| 2,089,757 | 8/1937 | Nieuwkamp | 33—76 |
| 2,586,430 | 2/1952 | Keller | 33—1 |

LEONARD FORMAN, *Primary Examiner.*

ISAAC LISANN, *Examiner.*